(No Model.) 4 Sheets—Sheet 1.

H. CREHAN.
BOLT POINTING MACHINE.

No. 495,395. Patented Apr. 11, 1893.

WITNESSES. INVENTOR.

(No Model.) 4 Sheets—Sheet 2.

H. CREHAN.
BOLT POINTING MACHINE.

No. 495,395. Patented Apr. 11, 1893.

WITNESSES.

INVENTOR.
Hubert Crehan
by
W. Bakewell & Sons
his attorneys (No Model.) 4 Sheets—Sheet 3.

H. CREHAN.
BOLT POINTING MACHINE.

No. 495,395. Patented Apr. 11, 1893.

WITNESSES. INVENTOR.

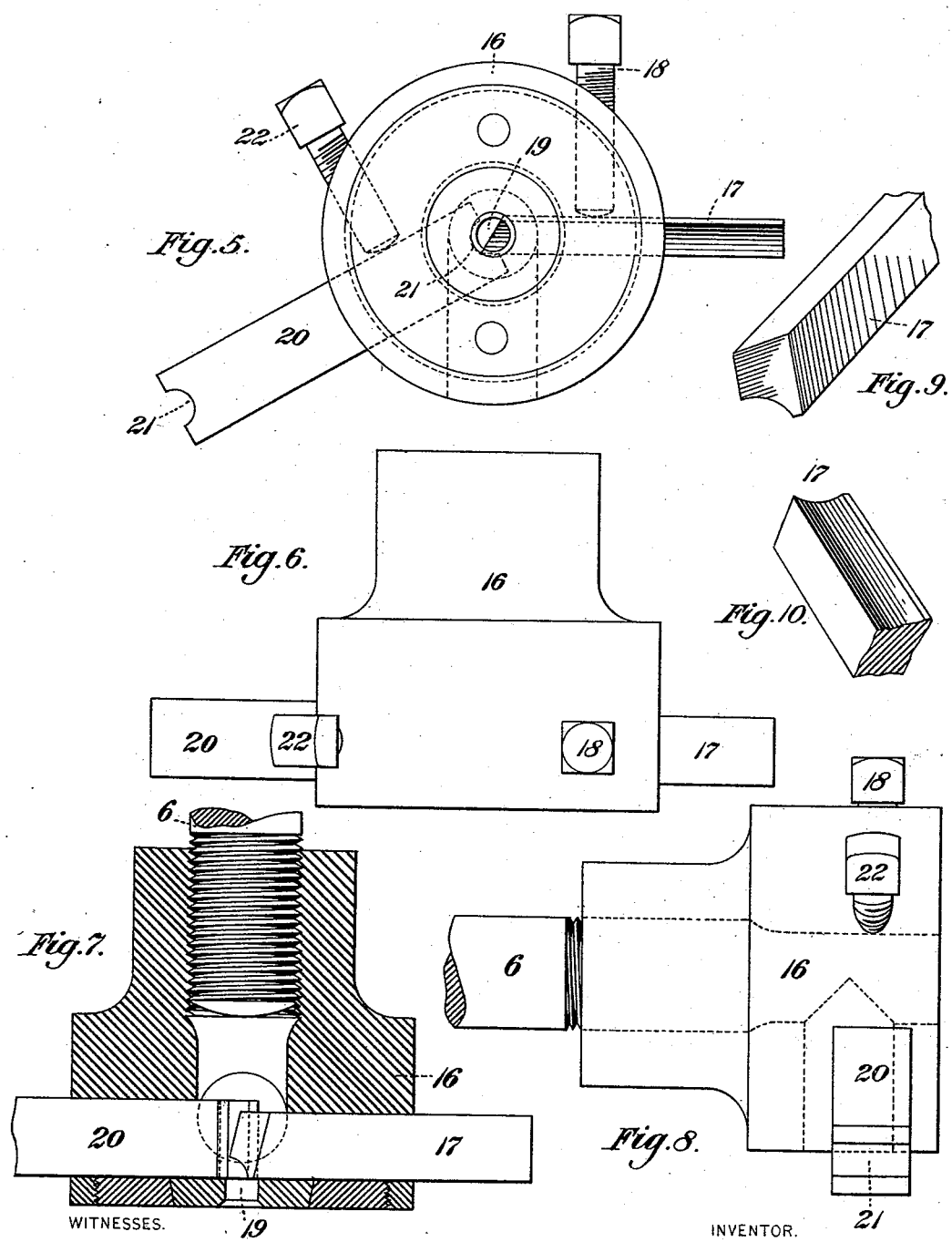

UNITED STATES PATENT OFFICE.

HUBERT CREHAN, OF PITTSBURG, PENNSYLVANIA, ASSIGNOR TO THE OLIVER IRON AND STEEL COMPANY, OF SAME PLACE.

BOLT-POINTING MACHINE.

SPECIFICATION forming part of Letters Patent No. 495,395, dated April 11, 1893.

Application filed December 9, 1891. Serial No. 414,460. (No model.)

*To all whom it may concern:*

Be it known that I, HUBERT CREHAN, of Pittsburg, in the county of Allegheny and State of Pennsylvania, have invented a new and useful Improvement in Bolt-Pointing Machines, of which the following is a full, clear, and exact description, reference being had to the accompanying drawings, forming part of this specification, in which—

Figure 1:
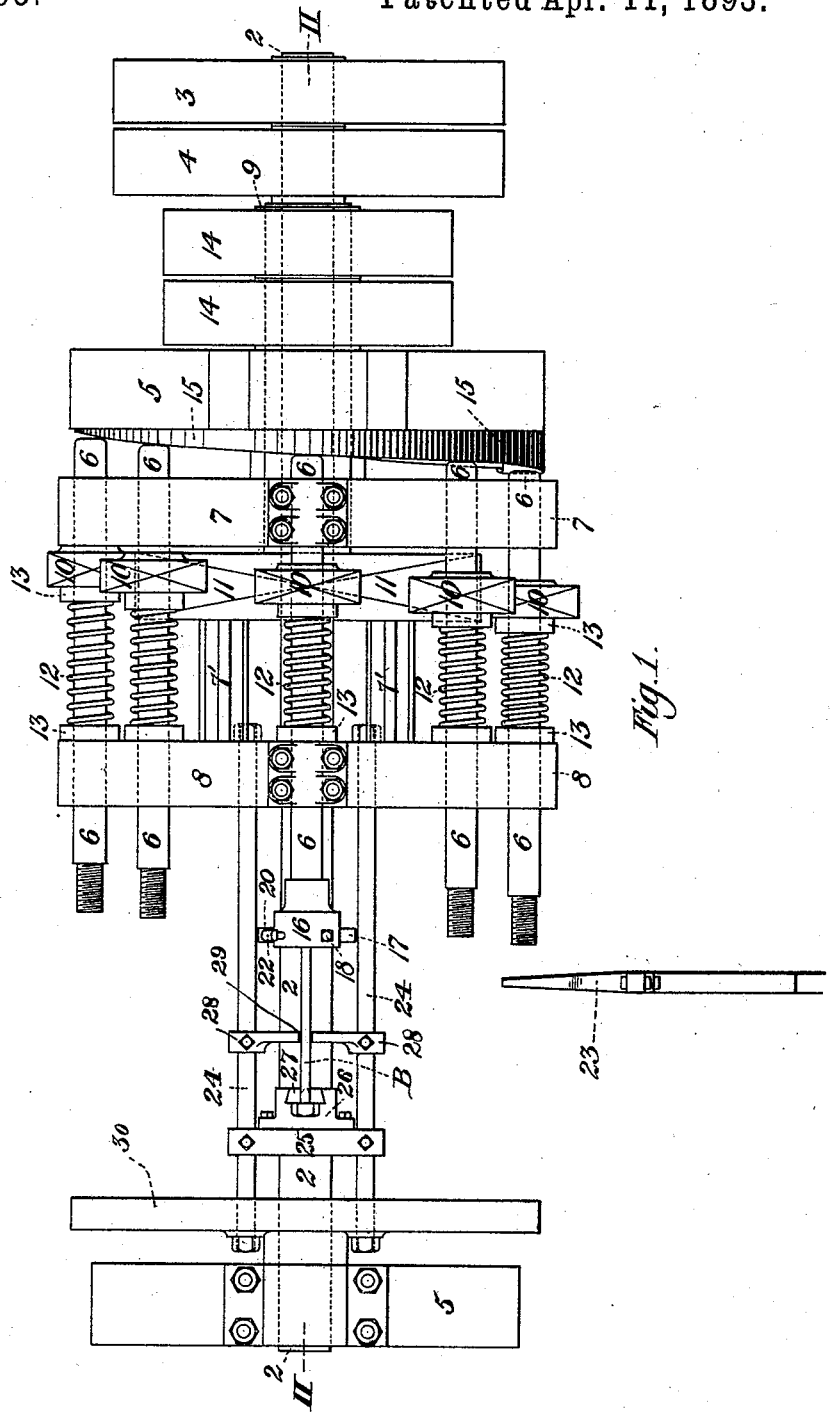
Figure 2:
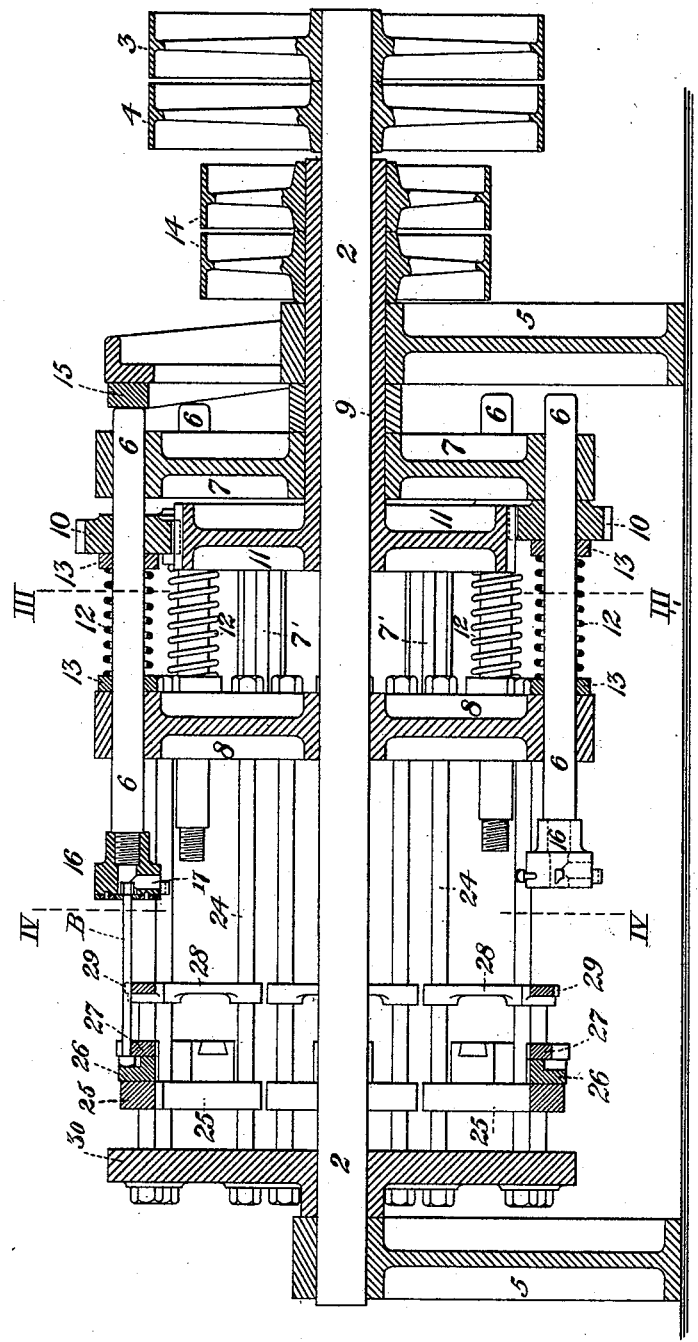
Figure 3:
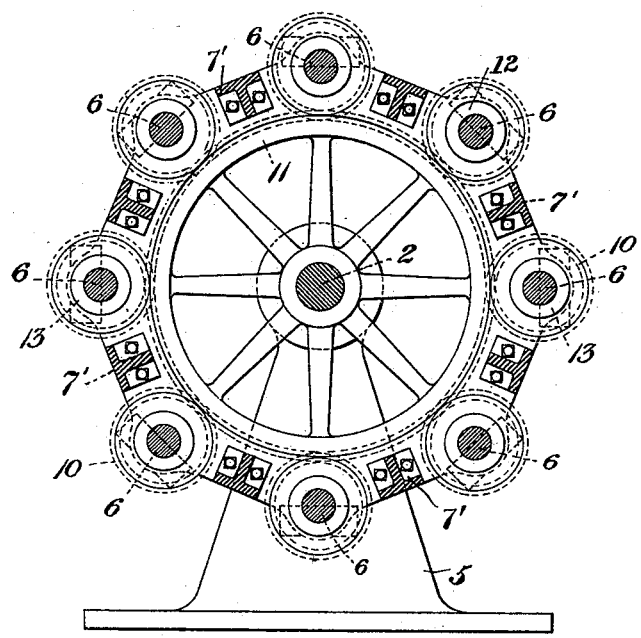
Figure 4:
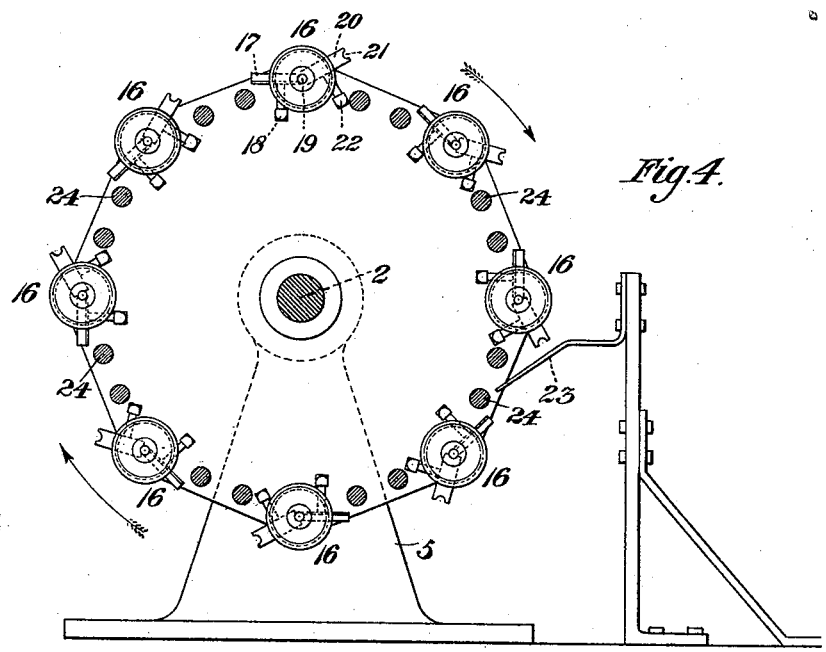

Figure 1 is a top plan view of my improved machine, the cutting heads being removed. Fig. 2 is a vertical longitudinal section on the line II—II of Fig. 1. Fig. 3 is a vertical cross-section on the line III—III of Fig. 2. Fig. 4 is a similar section on the line IV—IV of Fig. 2. Figs. 5, 6, 7 and 8 are detail views of the head carrying the pointing tool; and Figs. 9 and 10 are perspective views of the pointing-tool.

Like symbols of reference indicate like parts in each of the figures.

In the drawings, 2 represents the main shaft of the machine, and 3 and 4 are fast and loose pulleys for driving the shaft 2. The shaft 2 is journaled in suitable bearings in the upright frame 5 of the machine.

6, 6, are the spindles which carry the cutter-heads. There are any suitable number of these spindles. I have shown eight of them in the drawings. They are journaled in bearings in projecting heads or wheels 7, 8, of which the wheel 7 is journaled on the bush 9, which encircles the shaft 2, while the wheel 8 is keyed to the main shaft 2. The wheels 7 and 8 are preferably connected by tie-rods or braces 7', which unite the wheels and cause them to revolve in unison. Each of the spindles 6 is provided with a gear-wheel 10, which is keyed thereto, and the gear-wheels of the several spindles are in gear with the teeth of a pinion 11, which is loosely journaled on the shaft 2, and is preferably made integral with the bush 9, which is also loosely journaled on said shaft so as to be capable of rotation independently thereof.

12, 12, are springs interposed between the sides of the gear-wheels 10 and the opposing face of the wheel 8. These springs encircle the several spindles 6, and are preferably provided with collars 13, interposed between the ends of the springs and the surfaces against which they exert their force. The bush 9 and the wheel 11 are adapted to be rotated independently of the shaft 2, by means of fast and loose belt-pulleys 14. The spindles 6 are from their construction adapted to be moved longitudinally in their bearings, and for the purpose of imparting such motion thereto, a cam-ring or plate 15 is fixed to one of the uprights 5 of the machine-frame and is designed to bear against the ends of the spindles in the revolution around the axis of the shaft 2. As the ends of the spindles approach the prominent portion of the cam-ring, and when they reach the abrupt end thereof, they are in position to be retracted suddenly by means of the back pressure of the springs 12.

At the end of each spindle 6 is secured a head 16 which carries the pointing cutter, as shown in Figs. 5-10 inclusive. These heads 16 are screwed upon the ends of the spindles 6 and are provided with the pointing-cutters 17 which pass through suitable apertures in the sides of the heads and are held by set-screws 18. Through another side aperture in the head 16 is inserted and firmly held in place the adjustable supporting bar 20 which guides the end of the bolt and prevents its bending under the action of the pointer 17, being provided with a semi-circular groove 21 at each end and held by set-screws 22. The pointer, as shown in Figs. 9 and 10 is of suitable form for beveling the end of the bolt and forming a point thereon.

The lower one of the spindles shown in Fig. 2 is in its most retracted position, the bolt having already been thrown out by the ejector 23, shown in Fig. 4. This ejector, as shown, is simply a curved bar which projects into the path of the bolts as they are carried around and forces them out, the cutter having been retracted by passing out of contact with the cam-ring. As the main shaft 2 revolves and carries the spindle 6 around its axis, the ends of the spindles in succession come in contact with the cam-ring 15, and as they travel along this cam-ring, the spindles are moved forward lengthwise in their bearings by the action thereof, the effect of this being to feed forward the cutting-heads upon the bolts the several spindles meanwhile being rotated on their own axes by the rotation of the pinion 11. The upper one of the two spindles, shown in Fig. 2, is illustrated as having moved forward nearly one-half of the stroke imparted by the action of the cam-ring 15. During this motion the pointing of the bolt is effected, after which the spindle 6, having reached the end of the cam-ring 15 and its end being released therefrom, the spindle is forced back by the spring 12 into the position shown at the lower part of Fig. 2. The cam-ring 15 is preferably about two-thirds of a circle in extent and the revolution of the main-shaft effects the feeding of the pointing-heads to the bolts and the release of the bolts therefrom.

The means for holding the bolts during the pointing operation consists of a head or wheel 30, which is keyed to the main-shaft and connected to the wheel 8 by the tie-rods 24, which tie-rods serve as supports for the carriages or bolt-holders. These holders 25 consist of metal plates or bars set on the rods 24, as shown in Figs. 1 and 2, and on the inner side of each holder is bolted a block 26 having a plate 27, which is vertically slotted, the size and shape of the slot being such as to receive and neatly hold the square portion of the bolt next to the head. In advance of each holder is a transverse guide 28, having in the middle portion a notch or slot 29 on which the shank of the bolt rests and by which the bolt is centered and held in proper position with relation to the cutting-dies.

In the operation of the machine the operator stands at the side of the machine near the beginning of the cam-ring 15, and as the spindles in succession approach this cam-ring, he inserts a bolt B in the bolt-holder block 26. The bolts are then carried with the spindles around the axis of the shaft 2, and as the spindles are pushed forward by the cam-ring, as shown in Fig. 2, the pointing-cutter engages the bolt and by the revolution of the spindle forms the point thereon. The spindles are then retracted by the springs 12 and the bolts ejected.

I do not desire to claim herein anything which is described and claimed in my patent No. 431,560, dated July 8, 1890.

The advantages of my improvement will be appreciated by those skilled in the art. The machine is simple in construction, rapid in action, requires little attendance and is very durable. The construction of the several parts may be varied in many ways by the skilled mechanic.

The construction of the machine by which the spindles are caused to travel with planetary motion around the main shaft and to revolve on their own axes, these motions being effected independently, is of peculiar advantage in respect of the setting and adjusting of the dies when the spindles are caused to revolve without revolving the main frame in which they are carried. I am thus enabled to rotate the spindles on their own axes at a relatively high rate of speed, and to effect the complete cutting of the bolt in a partial revolution of the main shaft, and so that the bolt, when completely cut, will drop out of the holder automatically, instead of being held thereby until it is removed by hand. There is also especial advantage in that construction of the machine, by which, instead of feeding the bolts forward to the cutters, the cutters are fed forward to the bolts, since I secure thereby certainty and accuracy in the operation of the parts.

I claim—

1. In a machine for pointing bolts, the combination of a rotary frame, spindles journaled therein and carrying a pointing tool, means for rotating the spindles on their individual axes, and means for advancing each spindle successively a certain distance, substantially as described.

2. In a machine for pointing-bolts, the combination of a rotary frame, spindles journaled therein and provided with pointing-tools, means for rotating the spindles on their individual axes, and a stationary cam which bears on the spindles and projects them; substantially as and for the purposes described.

3. In a machine for pointing bolts, the combination of a rotary frame, spindles journaled therein, means for rotating the spindles on their individual axes, heads mounted upon the spindles and containing pointing tools adjustably secured therein, and means for advancing the spindles a certain distance; substantially as and for the purposes described.

4. In a machine for pointing bolts, the combination of a rotary frame, spindles journaled therein, means for rotating the spindles on their individual axes, heads containing guides for the bolts, suitable pointing-tools mounted upon the spindles, and means for advancing the spindles a certain distance, substantially as and for the purposes described.

In testimony whereof I have hereunto set my hand this 5th day of December, A. D. 1891.

HUBERT CREHAN.

Witnesses:
W. B. CORWIN,
H. M. CORWIN.